April 21, 1942.  H. E. SOMES  2,280,552
METHOD AND APPARATUS FOR MANUFACTURING PISTON RINGS
Filed March 23, 1939
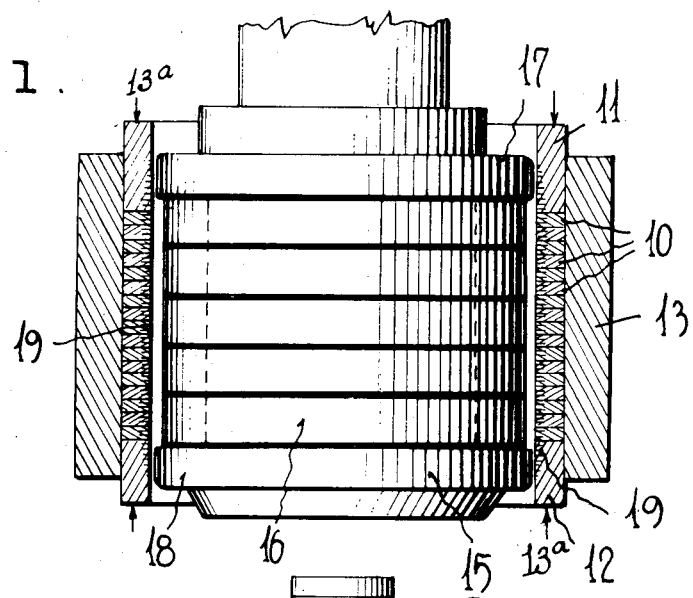
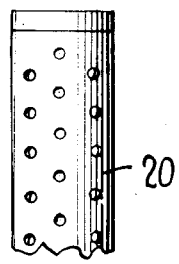
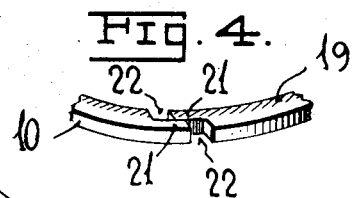
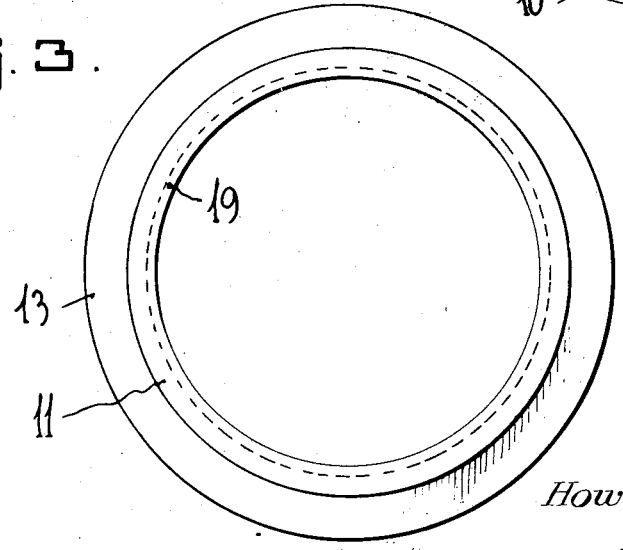
Inventor
Howard E. Somes
By John P. Tarbox
Attorney Patented Apr. 21, 1942

2,280,552

UNITED STATES PATENT OFFICE 2,280,552

METHOD AND APPARATUS FOR MANUFACTURING PISTON RINGS

Howard E. Somes, Grosse Pointe Park, Mich., assignor to Budd Induction Heating, Inc., Philadelphia, Pa., a corporation of Michigan Application March 23, 1939, Serial No. 263,605

8 Claims. (Cl. 148—10)

The present invention relates in general to the method of producing spring piston rings and the like and apparatus for carrying out the method.

An object of the invention is the provision of an improved method of producing springs, piston rings, or heavy duty snap rings and the like in quantity, rapidly and economically.

An important object of the invention is a method of making a unitary piston ring having the resiliency whereby the desired pressure contact with a cylinder wall in which the rings are to be used is attained without undue wear or scoring of the cylinder.

Another object is the provision of a method whereby groups of piston rings may be rapidly tempered or otherwise heat-treated uniformly throughout a portion situated symmetrically of the ring whereby unsymmetrical stresses and warping are avoided.

Another object is the provision of a method whereby pre-formed rings of relatively small axial thickness may be differentially heat treated each in an inner circumferential, marginal zone by electro-magnetic induction.

A further object is the provision of a method whereby piston rings or the like may be given a uniform expansive tension while in a continuous ring form, to enable them to be ground to a true circle before expanding and to expand of themselves under such uniform tension upon being split.

My improved method consists in general in providing a plurality of continuous rings formed of a material hardenable by heat treatment and preferably a magnetic material such as normalized or untempered steel, piling the rings one above the other in a group with the juxtaposed sides of the rings in good magnetic contact and with upper and lower annular end members of magnetic material, to form a composite cylinder of relatively low magnetic reluctance, and heat treating the interior of the piston rings of the composite cylinder by electro-magnetic induction. During heat treatment the group of rings are held clamped together against relative axial movement by the annular end members which form short cylindrical extensions at each end of the group, and are held against radial movement by an encasing cylinder, preferably of electro-magnetic material of relatively low reluctance. Thus there is provided a low reluctance path extending axially through the material of the rings beyond the end rings of the group, and extending radially through the rings beyond their outer circumference.

The piston rings of the composite cylinder formed of the group of rings and cylindrical end pieces are heated to the temperature required for tempering, substantially uniformly throughout a zone extending from the inner surface outwardly a radial distance less than the radial thickness of the rings. Immediately after the establishment of this condition the heating means is withdrawn and the cylindrical assemblage rapidly quenched preferably from the inner surface, with the result that the inner portions of the rings are rendered hard and resilient while the outer portions remain relatively soft or unhardened.

This differential heat treatment of the inner portion of the rings sets up a substantial amount of autofrettage evidenced by expansion of the rings when split.

The invention will be more clearly understood and further advantages thereof will be apparent upon a perusal of the following specification and the drawing accompanying the same.

In the drawing:

Fig. 1 is a vertical axial section through a group of rings assembled for treatment with the induction head in operative position.

Fig. 2 is a fragmentary view of the upper portion of a quenching nozzle.

Fig. 3 is a top plan view of the ring assemblage of Fig. 1.

Fig. 4 is a fragmentary detail of the split portion of the finished ring.

In carrying out the method, a plurality of continuous rings 10, preferably of magnetic material hardenable by heat treatment, such as unhardened or normalized steel, are stacked one upon another in a group between upper and lower end members 11 and 12, to form a composite cylinder of a diameter and wall thickness equal to the diameter and radial thickness of the rings, the rings and end pieces being held by encasement in the outer cylinder element 13. The rings 11 and 12 may be clamped together and upon the stack of rings in any suitable manner. Some convenient clamping means 13a is indicated by the arrows in Fig. 1 as acting upon the members 11 and 12, either of which may be regarded as a clamp or as an abutment, regardless of which is movable. To reduce the reluctance to magnetic lines extending axially through the assemblage of rings, the top and bottom sides of the rings are suitably finished, preferably by grinding to afford the establishment of substantially uniform contact between the rings and between the end rings and the end pieces 11 and 12. The encasement cylinder element 13 is preferably also of magnetic material of low reluctance and shaped to contact with the outer surface of the cylindrical assemblage 10—11—12 or permit extremely small clearance between itself and the cylindrical assemblage. The induction head 15 which may be of any known or other suitable form, preferably of the type shown and described in my co-pending application S. N. 96,346, filed August 17, 1936, is arranged to be inserted into the cylindrical assemblage as shown in Fig. 1 with its inducing coil 16 in close proximity to the interior surface of the rings 10 and its magnetic pole pieces 17 and 18 in close proximity to the upper and lower end pieces 11 and 12 respectively.

With the induction head in the position shown, and energized with alternating current of the requisite intensity and frequency, the interior portion of the piston ring cylinder assemblage becomes rapidly heated to the desired hardening temperature substantially uniformly through a zone intermediate the extreme ends of such assemblage and extending radially outwardly from the inner surface a distance less than the radial thickness of the rings, as indicated by the shaded portion 19.

Immediately upon establishment of this substantially sharply defined heated zone, the induction head 15 is withdrawn upwardly and a quenching nozzle 20 moved upwardly into the interior of the cylindrical assemblage and operated to spray a suitable quenching fluid against the inner surface of the cylindrical assemblage to suddenly quench the same, whereupon the individual rings 10 are each differentially tempered or hardened substantially uniformly in the zone 19.

The individual rings may now be removed and either after or before a suitable final finishing as by grinding or the like, are split in any known or other suitable manner, as for example that indicated in Fig. 4, to provide an open lap-joint such as the mutually engaging tongues 21 and recesses 22.

Upon splitting the ring expansion takes place, due to autofrettage effect set up by the localized heat treatment, the amount of expansion varying according to the proportions of the ring and the kind and radial extent of heat treatment.

An advantage of the present method is that the rings, before splitting may be accurately ground to a substantially true circle so that after splitting and autoexpansion due to autofrettage they tend to form a true circle when compressed back to the original diameter. Preferably during the application of heat, the induction head is rotated by any suitable means to insure uniform annular distribution of heat, resulting in symmetry of form of the heat treated zone and symmetrical application of the resultant stresses both during and after treatment, which with the holding of the rings fixed in the composite cylinder assemblage as shown in Fig. 1, during heating and quenching, insures against warping.

In carrying out the above described method it is possible as will be understood by those skilled in the art and as described in the aforesaid and others of my copending applications, to choose a current frequency, rate of energy input and duration of application of energy such as will result in an extremely narrow zone of transition between the inner hardened zone and the outer unhardened zone. It is therefore an important advantage of the present method that this narrow zone of transition permits a large portion of the piston ring to be tempered with the tempered portion closely approaching the outer periphery of the ring, without danger of partial hardening of the outer surface portion, or of the transition zone reaching the outer surface.

The broad aspect of the magnetic material 13 is claimed in my copending application Ser. No. 277,995, filed June 8, 1939, for Heat treatment.

While I have herein described certain specific modes of procedure, for the sake of disclosure, it is to be understood that the invention is not limited to such specific modes, but contemplates all such variants and modifications thereof as fall fairly within the scope of the appended claims.

What I claim is:

1. The method of manufacturing piston rings which comprises forming a plurality of continuous rings of metal hardenable by heat treatment and having complementary side surfaces so that the side of one will substantially uniformly contact with the adjacent sides of others when the rings are stacked, one contiguous the other, stacking the rings to form a composite cylinder, clamping the stacked rings, lowering the magnetic reluctance of the stacked rings by encasing the composite cylinder in an encasement of magnetic material and differentially heat treating and hardening the composite cylinder as a unit from the inside by rapid electromagnetic induction and quenching the radially inner face of the stacked rings whereby the inner face is hardened with respect to the outer portion.

2. Apparatus for manufacturing piston rings which comprises a cylindrical encasing element of magnetic material arranged to receive and hold a cylindrical stack of separate rings of outside diameter slightly less than the inside diameter of the encasing element, and an induction heating element arranged to be moved into and out of the stack of rings.

3. Apparatus for manufacturing piston rings comprising a cylindrical encasing element of magnetic material having an inside diameter proportioned to receive a stack of separate rings with slight clearance between the outer surface of the rings and the inner surface of the encasing member, an induction heating element arranged to be moved into and out of a stack of rings held within the casing member and means arranged to hold the stack of rings clamped together within the casing member against relative axial movement.

4. Apparatus for manufacturing piston rings comprising a cylindrical encasing element of magnetic material having an inside diameter proportioned to receive a stack of separate rings with slight clearance between the outer surface of the rings and the inner surface of the encasing member, an induction heating element arranged to be moved into and out of a stack of rings held within the casing member, and a pair of end extension members held within the casing member and arranged to hold the stack of rings clamped together within the casing member against relative axial movement, together with a quenching nozzle arranged to be moved into the stack of rings within the encasing element.

5. An apparatus for the inductive heating of work in the general form of a cylinder having a relatively shallow depth in a radial direction which includes a clamp member of magnetic material engaging at least one end of the work, an inducing coil for cooperation with said clamp member and work, an abutment engaging the work to receive the thrust of said clamp member and a wall of magnetic material magnetically contiguous said clamp member, abutment and work on the side opposite the inducing coil and extending axially of the work for substantially the entire length of the work whereby a low reluctance flux path is provided through said clamp member, abutment and last-mentioned wall, the surface of the work, abutment and clamp member which are adjacent the coil being substantially flush.

6. An apparatus for hardening the radially inner surface of a number of rings having flat side faces of generally the same diameter which includes a guide by means of which said rings may be axially aligned and held against substantial movement transversely of their axes when aligned, an axial clamp for pressing said rings together contiguous said guide, said clamp including abutments at each end of the aligned rings which are of substantially the same inner and outer diameters as said rings, an inducing coil for cooperation with said rings on their faces opposite that adjacent said guide, a quenching nozzle for said rings after being heated, whereby the rings may be heated only to the desired radial depth and then quenched, said guide being of magnetic material and longitudinally overlapping each clamping abutment at least in part whereby a low reluctance flux path is provided through said guide and around some of the ring portions so that the danger of heating in the portions of the rings away from said coil is reduced when the rings are of relatively shallow radial depth.

7. The method of manufacturing piston rings which comprises forming a stack of continuous rings of ferrous metal hardenable by heat-treatment, one contiguous another in close magnetic coupling, placing a pair of cylindrical elements of magnetic material of low reluctance at the ends of the stack with their inner and outer faces substantially flush with the inner and outer faces of the rings, to form with the rings a composite cylinder, differentially heating the piston rings of the composite cylinder by electromagnetic induction to at least a hardening temperature and quenching the heated inner face of said stacked piston rings.

8. The method of manufacturing piston rings which comprises forming a stack of continuous rings of ferrous metal hardenable by heat treatment substantially coaxially one contiguous another in close magnetic coupling, placing a pair of cylindrical elements of magnetic material at the ends of the stack with their inner faces substantially flush with the inner faces of the rings and entirely radially outside of an induction heating head to form with the rings a composite cylinder, differentially heating the piston rings of the composite cylinder on the inside by electromagnetic induction from said head, and quenching said rings from the inside.

HOWARD E. SOMES.